(12) United States Patent
Tyson et al.

(10) Patent No.: US 9,217,454 B2
(45) Date of Patent: Dec. 22, 2015

(54) SPLINED FASTENER

(75) Inventors: Anthony Joseph Tyson, Dunstable Bedfordshire (GB); Roger Andrew Williams, Bushey Hertfordshire (GB)

(73) Assignee: Infastech Intellectual Properties Pte. Ltd., Singapore (SG)

( * ) Notice: Subject to any disclaimer, the term of this patent is extended or adjusted under 35 U.S.C. 154(b) by 0 days.

(21) Appl. No.: 14/114,023

(22) PCT Filed: Apr. 25, 2012

(86) PCT No.: PCT/GB2012/050912
§ 371 (c)(1),
(2), (4) Date: Dec. 5, 2013

(87) PCT Pub. No.: WO2012/153101
PCT Pub. Date: Nov. 15, 2012

(65) Prior Publication Data
US 2014/0133937 A1   May 15, 2014

(30) Foreign Application Priority Data

May 11, 2011   (GB) .................................. 1107875.5

(51) Int. Cl.
*F16B 13/06* (2006.01)
*F16B 19/04* (2006.01)
*F16B 19/10* (2006.01)
*B21J 15/04* (2006.01)
(Continued)

(52) U.S. Cl.
CPC ................ *F16B 19/04* (2013.01); *B21J 15/02* (2013.01); *B21J 15/041* (2013.01); *B21J 15/043* (2013.01); *B21J 15/10* (2013.01); *B21J 15/34* (2013.01); *F16B 19/1045* (2013.01); *F16B 19/1081* (2013.01); *Y10T 29/49956* (2015.01); *Y10T 29/5377* (2015.01)

(58) Field of Classification Search
CPC ........ F16B 19/00; F16B 19/002; F16B 19/06; F16B 19/08; F16B 19/10; F16B 19/1045; F16B 21/084; F16B 21/086; F16B 2019/1009; F16B 2019/1018; F16B 13/06; F16B 19/04; F16B 19/1081
USPC .......... 411/43, 44, 51, 69, 445, 500, 501, 504
See application file for complete search history.

(56) References Cited

U.S. PATENT DOCUMENTS 1,654,510 A * 12/1927 Dyresen ........................ 24/690
2,366,510 A *  1/1945 Frank ............................ 411/445
(Continued)

FOREIGN PATENT DOCUMENTS

GB        532899      2/1941
GB       1538872      1/1979
(Continued)

*Primary Examiner* — Roberta Delisle
(74) *Attorney, Agent, or Firm* — Hahn, Loeser & Parks LLP; Arland T. Stein

(57) ABSTRACT

A fastener (2) for securing a workpiece comprising a plurality of workpiece members, said fastener comprising a shank (4) and a radially enlarged head (6), wherein the fastener further comprises axial voids (40) and splines (18) provided on the internal wall of the bore of the fastener, such that when the fastener is installed into a workpiece by a mandrel, breakstem or pin, once the shank of the fastener has contacted with the walls of the workpiece apertures, the crests of the splines are deformed by the mandrel, breakstem or pin, and material of the crests is displaced into the voids.

24 Claims, 16 Drawing Sheets

(51) Int. Cl.
    *B21J 15/34* (2006.01)
    *B21J 15/02* (2006.01)
    *B21J 15/10* (2006.01)

(56) References Cited

U.S. PATENT DOCUMENTS

| | | | | |
|---|---|---|---|---|
| 3,136,204 | A | * | 6/1964 | Reynolds ........................ 411/70 |
| 3,837,208 | A | * | 9/1974 | Davis et al. ................. 72/370.07 |
| 4,003,288 | A | * | 1/1977 | Jeal ................................ 411/70 |
| 4,044,591 | A | * | 8/1977 | Powderley ................ 72/370.07 |
| 4,089,249 | A | | 5/1978 | Binns |
| 4,405,256 | A | * | 9/1983 | King, Jr. .................... 403/408.1 |
| 4,781,501 | A | * | 11/1988 | Jeal et al. ........................ 411/43 |
| 4,877,363 | A | | 10/1989 | Williamson |
| 4,897,003 | A | * | 1/1990 | Bradley et al. .................. 411/43 |
| 5,054,977 | A | * | 10/1991 | Schultz ............................ 417/43 |
| 5,143,500 | A | * | 9/1992 | Schuring et al. .............. 411/339 |
| 2013/0209196 | A1 | * | 8/2013 | Brewer ........................ 411/500 |

FOREIGN PATENT DOCUMENTS

| | | |
|---|---|---|
| GB | 2063411 | 6/1981 |
| GB | 2353834 | 7/2001 |

\* cited by examiner

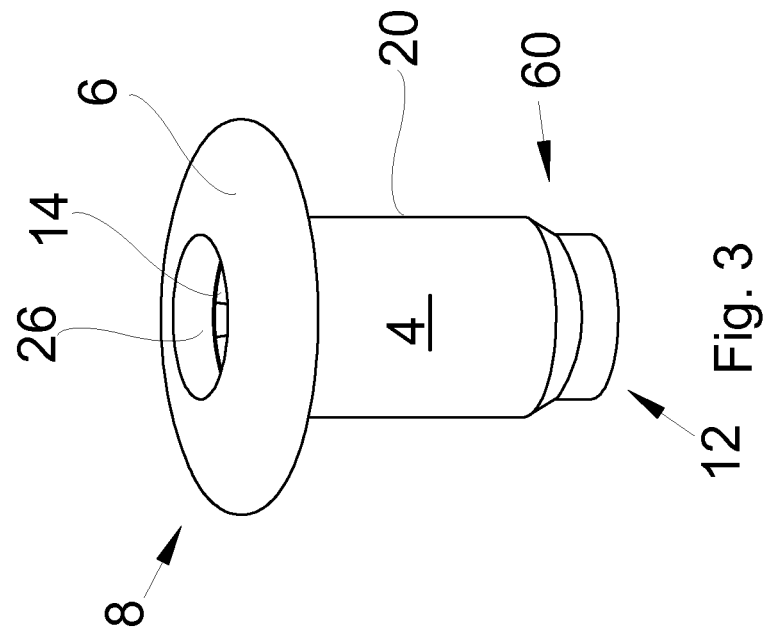
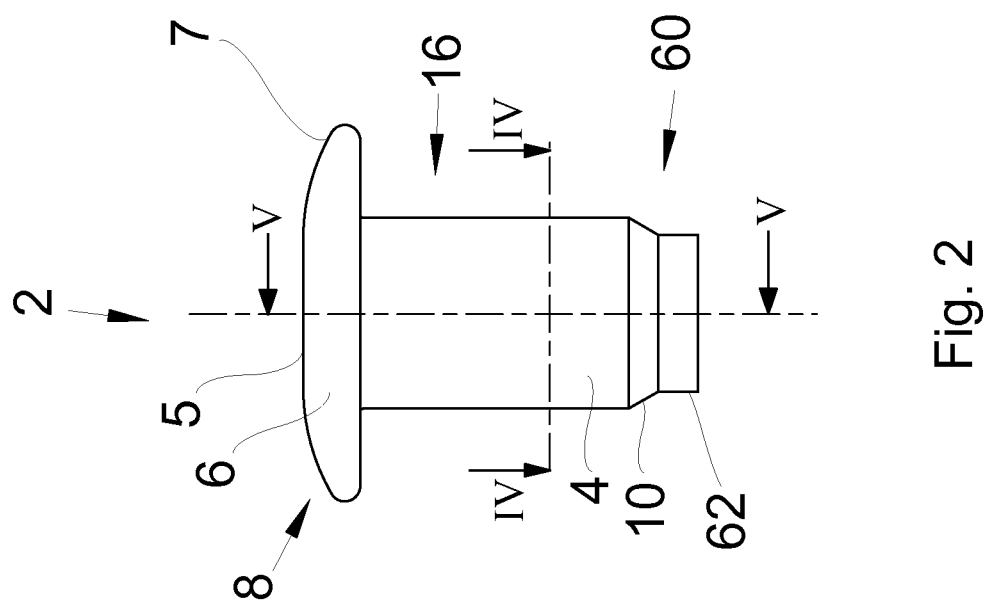

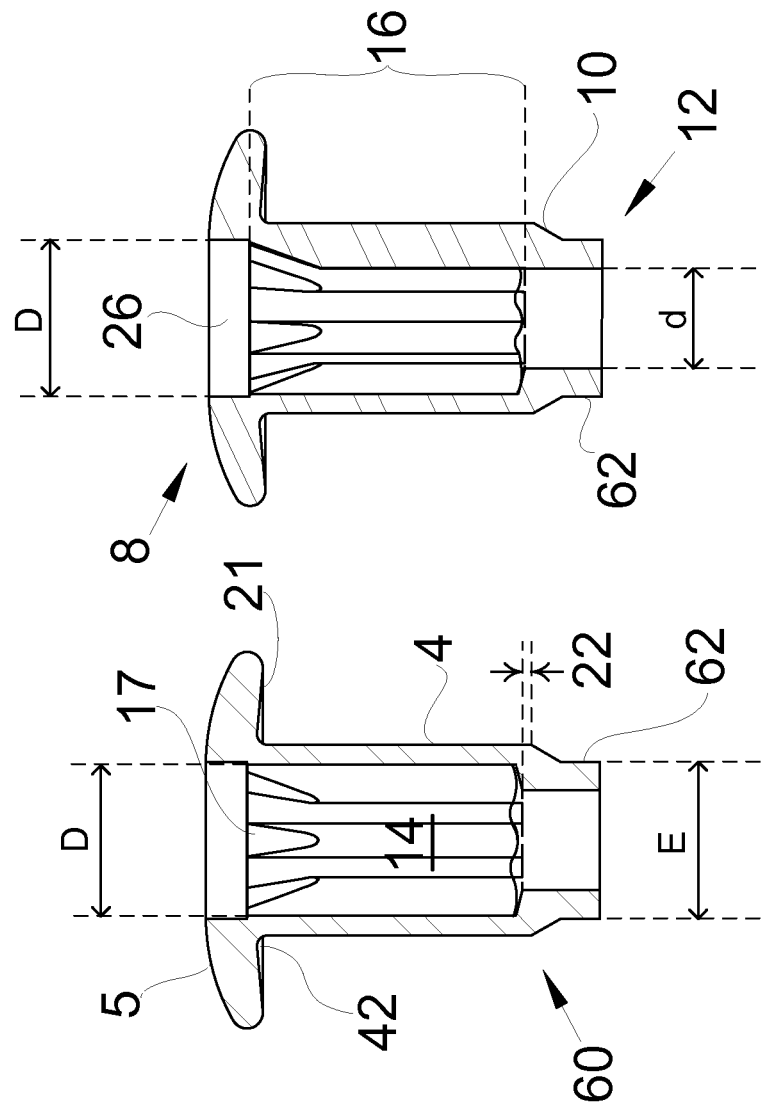
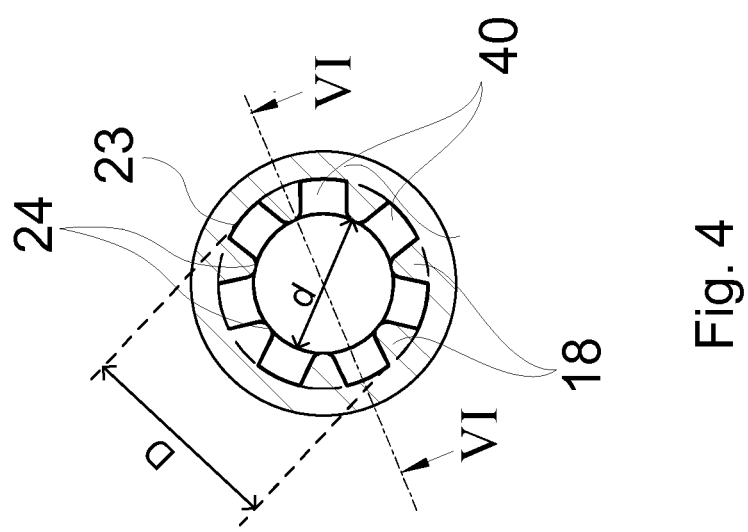

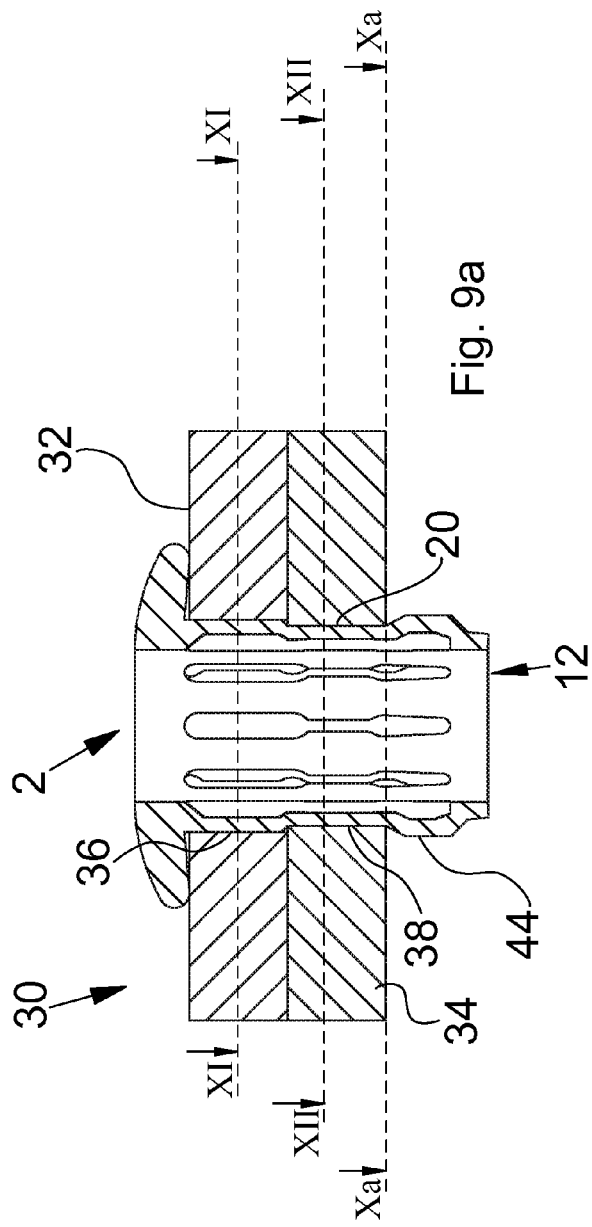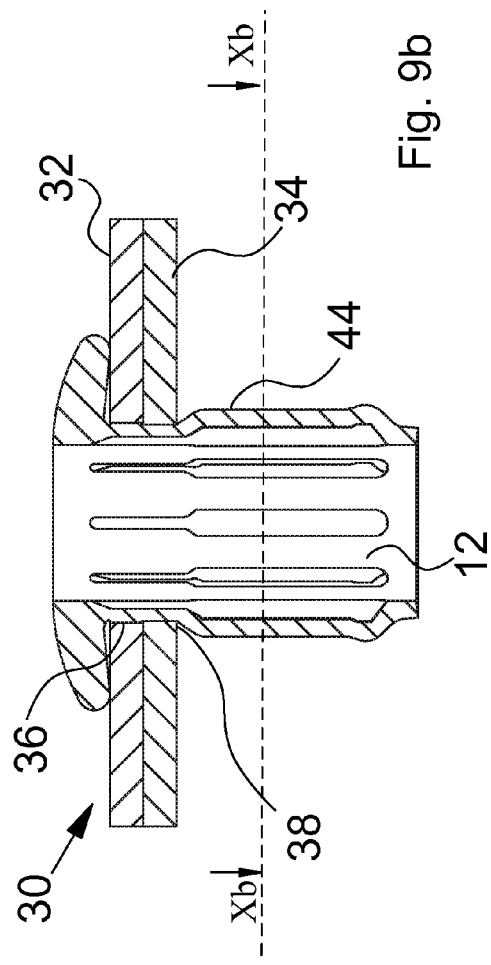

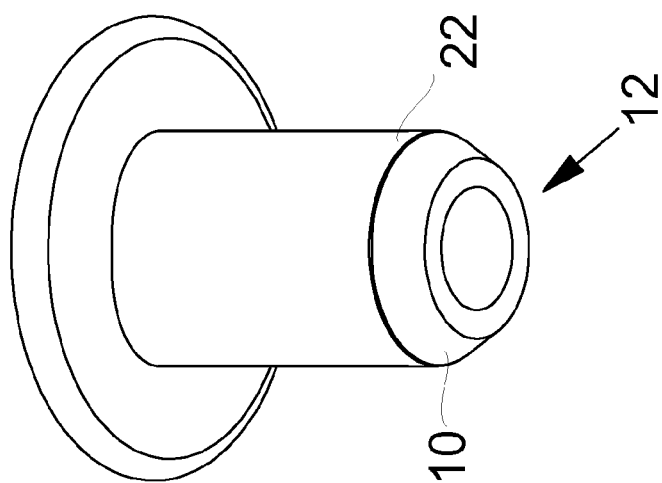
Fig. 22
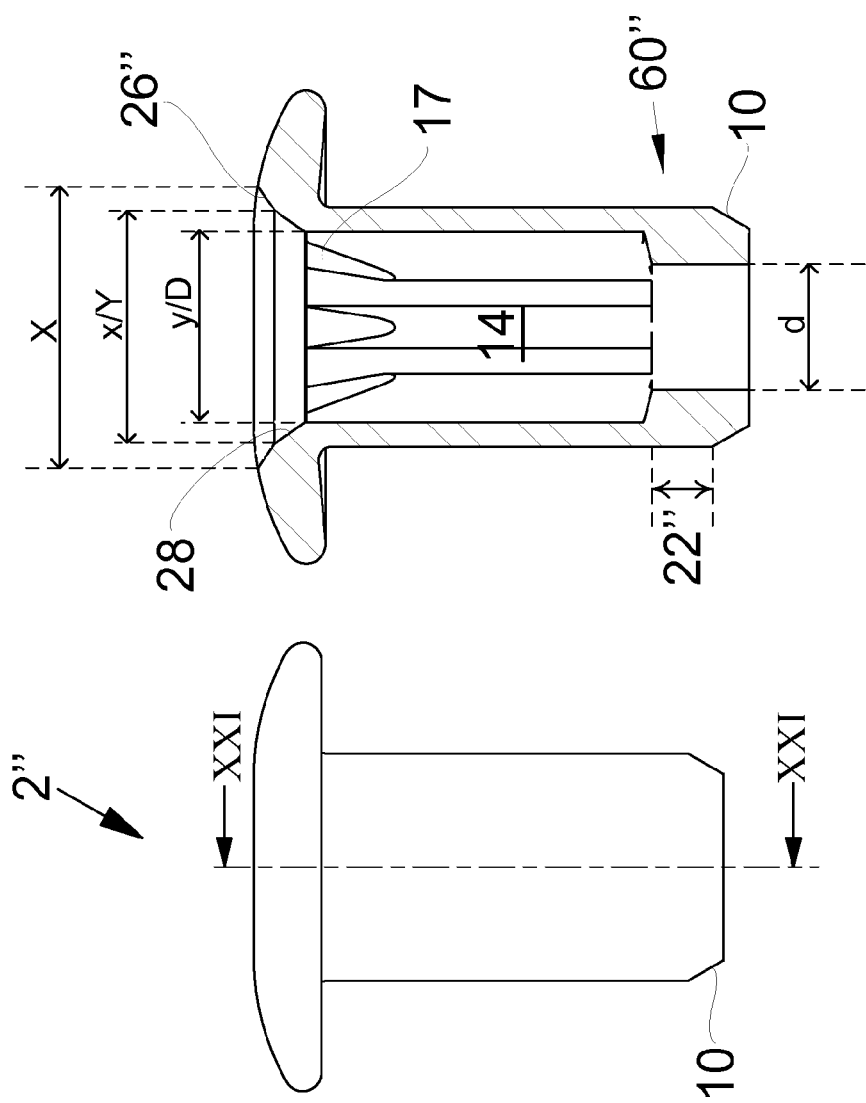
Fig. 21
Fig. 20

SPLINED FASTENER

CROSS-REFERENCE TO RELATED APPLICATIONS

The application is a national phase filing of International Application No. PCT/GB2012/050912, filed on Apr. 25, 2012, which claims priority to Great Britain Application No. 1107875.5, filed on May 11, 2012, each of which is incorporated herein by reference.

BACKGROUND AND SUMMARY

This invention relates to a speed fastener for securing apertured workpiece members together.

Speed Fastening® is a well known method of securing workpiece members together, whereby a fastener, such as a rivet, having a hollow core is placed in aligned apertures in the workpiece members, and a headed mandrel is pulled through the core of the fastener to cause radial expansion of the fastener shank, and additionally a small degree of foreshortening of the fastener. The radial expansion of the fastener shank ideally achieves hole filling of the holes in the workpiece members. The axial foreshortening effect can help pull the rearmost sheet up towards the fastener head to close gaps between the workpiece members.

Prior art fasteners, such as those available under the trademarks Briv® (as described in UK patent number GB1323873) and Chobert®, have shank portions which in the centre region have a uniform wall thickness. In both cases, the tail end of the fastener shank has an increased wall thickness; in the case of the Briv fastener this is an enlarged outer diameter and in the case of the Chobert fastener, a reduced bore diameter of tapered form.

These prior art fasteners are installed by pulling a mandrel of a given diameter through the fastener bore, thereby causing a radially enlarged head of the mandrel to expand the central region of the shank into the apertures in the workpiece members. Accordingly, the degree of radial expansion is governed by the diameter of the mandrel head for a nominal fastener diameter.

Prior art fasteners have a low degree of tolerance in workpiece aperture diameter, i.e. only a limited range of workpiece aperture diameters can be accommodated with a nominal fastener size and a single head diameter mandrel. Accordingly, there is a narrow range between the two acceptable extremes of workpiece aperture diameter when using a nominal fastener and a specific head diameter mandrel.

In an optimised installation of a prior art fastener, i.e. wherein the workpiece aperture diameters are within the acceptable range for a given fastener diameter and mandrel head diameter, the expansion of the fastener shank by the mandrel head causes mechanical engagement between the fastener shank and the walls of the workpiece apertures, without 'overpacking' (as explained below). The constraint provided by the wall of the aperture of the rear workpiece member (i.e. the workpiece member which is furthest away from the fastener head) generates radial forces and hence frictional resistance to axial movement of the rear workpiece member relative to the fastener shank.

However, if a workpiece aperture diameter is smaller than the acceptable range for a prior art fastener, an unduly high placing force will be required to install the fastener because it will be overpacked in the aperture. This can cause wear of the mandrel or cause other undesirable effects such as debris generation from the fastener bore, or fastener head malformation, such as by extrusion of fastener bore material up into the head region.

It is common for the aperture diameter of the top workpiece member (i.e. the workpiece member which is closest to the fastener head) to be configured such that it is slightly larger than the aperture in the rear workpiece member, in order to accommodate aperture pitch errors. If the aperture diameter of the top workpiece member is above the acceptable range for a prior art fastener, the expansion of the shank of the fastener does not result in any mechanical engagement between the fastener shank and the wall of the oversized workpiece aperture, resulting in low resistance of the joint to movement under shear loads.

To compensate for oversize workpiece apertures, an oversized mandrel, i.e. a mandrel having an oversized head, can be used to install a fastener. However, there is a risk that an oversized mandrel can incorrectly be used for a undersized workpiece aperture, thereby leading to the problems caused by a high placing force as discussed above.

The problem of a workpiece aperture diameter being above the acceptable range for a specific fastener diameter and mandrel head diameter is illustrated in FIG. 1, which illustrates a prior art fastener 2 installed into a workpiece 30 at the lowest end of a grip range. The workpiece comprises a top workpiece member 32 having an oversized aperture 36, and a rear workpiece member 34 having an acceptable aperture 38. Due to the top workpiece member 32 having an oversized aperture 36, the installation has not resulted in any mechanical engagement between the fastener shank 4 and the wall of the oversized aperture 36.

A correctly installed prior art fastener exhibits a enlarged tail end formation due to the greater wall thickness in that region. In a maximum-grip application, this enlarged tail end formation is adjacent to the outer surface of the rear workpiece member and so serves to provide support and resistance to movement of the joint if subject to tensile loads. However in a mid-grip or a minimum-grip condition (as shown in FIG. 1) the enlarged tail formation 44 is remote from the rear workpiece member 34 and it is therefore unable to help resist initial separation of the workpiece members 32, 34 under tensile loads; the resistance must result almost entirely from the frictional forces resulting from the radial pressure exerted by the expanded central region of the fastener shank 4 having a uniform wall thickness. Consequently the resistance to separation is lower in mid or minimum-grip conditions.

Other speed fasteners which are currently available, such as those available under the trade marks Avtronic® and Rivscrew®, feature a non-uniform wall thickness in the centre of the fastener shank. These fasteners comprise voids on the exterior of the fastener shank in the form of annular grooves and a helical screw thread form respectively. These fasteners are intended to expand and embed into a workpiece wherein the workpiece members are comprised of a material which is relatively soft in comparison to the material of the fastener. The annular or helical voids of these fasteners lead to variable expansion into the apertures of the workpiece members, with high or low degrees of mechanical engagement between the fastener shank and the wall of the workpiece apertures, and accordingly a consistent and sufficient engagement between the fastener shank and the wall of the workpiece apertures cannot be guaranteed. Furthermore, these prior art fasteners result in an expanded tail form of inconsistent size or distribution around the hole periphery.

The present invention is aimed at providing a fastener which will at least mitigate the above problems, and ensure complete and consistent mechanical engagement between the fastener shank and the wall of both the workpiece apertures, i.e. achieve complete mechanical engagement for a fastening which is more robust than is achievable with prior art fasteners. The present invention is also aimed at providing a fastener which allows the specification of a single fastener length and one mandrel size to install into a wider grip range and which can tolerate a far greater variation in workpiece aperture diameter than prior art fasteners, whilst avoiding the problems of high placing force, mandrel wear, debris generation and fastener head malformation with a single mandrel head size or diameter.

Furthermore the present invention is aimed at providing a fastener which is suitable for use in securing workpiece members which may be of harder material than the fastener, and wherein the grip range of the fastener is dependent only upon the length of the fastener i.e. a longer fastener has a greater grip range, allowing a fastener having a nominal length to be used in a wider range of workpiece thicknesses.

Accordingly the present invention comprises, in a first aspect, a fastener for securing a workpiece comprising a plurality of workpiece members, said fastener comprising a shank with a head end and a tail end remote from the head end, and a radially enlarged head at the head end of the shank, and a bore extending throughout the fastener, wherein an internal wall of the shank comprises a voided section comprising a plurality of voids separated by a plurality of splines each of which culminates in a crest, the voids and splines being elongated in an axial direction with respect to a longitudinal axis of the fastener bore; wherein the splines are of an approximate trapezoidal cross-section.

The present invention comprises, in further aspects, a method of installation of a fastener comprising the steps of placing a mandrel having a radially enlarged head through the fastener bore such that the radially enlarged head of the mandrel is adjacent the tail end of the fastener shank, inserting the fastener and mandrel into the apertures in the first and second workpiece members such that the fastener head contacts the first workpiece member, and supporting the fastener at the head end whilst drawing the mandrel entirely through the fastener bore, thereby expanding the fastener shank into the apertures of the workpiece members, and causing the crests of the splines to be deformed, and causing the tail end of the fastener shank to radially enlarge adjacent to the second workpiece member. The present invention also comprises, in further respects, an apparatus for securing a workpiece comprising a plurality of workpiece members, said apparatus comprising a fastener and a mandrel; said fastener comprising a shank with a head end and a tail end remote from the head end, and a radially enlarged head at the head end of the shank, and a bore extending throughout the fastener; wherein an internal wall of the shank comprises a voided section comprising a plurality of voids separated by a plurality of splines each of which culminates in a crest, the voids and splines being elongated in an axial direction with respect to a longitudinal axis of the fastener bore; wherein the splines are of an approximate trapezoidal cross-section.

The installation of the fastener may be undertaken by a tool comprising a conical concave end face which bears on an upper surface of the fastener head. This causes the fastener head to be pushed towards the top workpiece member and the head to flatten slightly against the top workpiece member, and thereby ensuring clamping of the fastening. The flattening of the head periphery against the top workpiece member acts such that the outer diameter of the underhead recess decreases, and the bearing area of the fastener head against the workpiece is increased. Furthermore the bearing area of the tool end face on the upper surface of the fastener head is greater than with prior art speed fasteners such that undesirable indentations or damage to the surface of the fastener head are minimised during installation of the fastener.

The present invention comprises, in further aspects, a method of installation of a fastener comprising the steps of inserting a stem comprising a radially enlarged head and a breakneck point into the fastener through the fastener bore such that the radially enlarged head of the stem is adjacent the tail end of the fastener shank; inserting the fastener and the stem into the apertures in the first and second workpiece members such that the fastener head contacts the first workpiece member; supporting the fastener at the head end whilst pulling the stem with respect to the fastener head, thereby causing the stem head to enter the tail end of the fastener shank thereby radially expanding the fastener shank into the apertures of the workpiece members, and causing the crests of the splines to be deformed against the stem head, and causing the tail end of the fastener shank to radially enlarge adjacent to the second workpiece member; wherein the stem is pulled with respect to the fastener head through the fastener bore until the stem fractures at the breakneck point. The present invention comprises, in yet further aspects, a method of installation of a fastener comprising the steps of inserting the fastener into the apertures in the first and second workpiece members such that the fastener head contacts the first workpiece member; inserting a breakstem comprising a plugging portion with a hollow core, an elongate shank, and a breakneck point between the plugging portion and the elongate shank, into the bore of the fastener, such that the plugging portion of the breakstem contacts the tail end of the fastener shank; pulling the elongate shank of the breakstem pulled relative to the fastener, thereby causing the breakstem plugging portion to enter the fastener shank, causing the fastener shank to expand into the workpiece apertures, and causing the crests of the splines to be deformed against the plugging portion, and simultaneously causing the plugging portion to collapse inwardly; wherein the elongate shank is pulled relative to the fastener until the breakstem fails at the breakneck point.

A fastener installed by the disclosed methods may further comprise a parallel portion between the breakneck point and the plugging portion, which, during installation, forms a locking skirt thereby providing a mechanical lock of the installed stem in the fastener shank.

The present invention comprises, in a further aspect, a method of installation of a fastener comprising the steps of inserting the fastener into the apertures in the first and second workpiece members such that the fastener head contacts the first workpiece member; and driving a solid pin, having a maximum diameter larger than that of the fastener bore, into the bore of the fastener via the head thereby to radially enlarge the fastener shank into mechanical engagement with the workpiece apertures, and causing the crests of the splines to be deformed against the solid pin. This method may further comprise a subsequent step of bearing on the fastener head by a support sleeve, and removing the pin from the fastener bore.

Pulling the mandrel head, or pushing a solid pin, through the bore causes the fastener shank to increase in diameter to engage mechanically with the wall of the workpiece apertures.

The axial voids of the present invention allow a variable degree of radial crushing of the fastener bore splines by the mandrel head as it is pulled through different sizes of workpiece member aperture, such as an oversized aperture in the top workpiece member, thereby providing mechanical resistance to shear movement, without leading to 'overpacking', thereby avoiding potentially excessive placing loads, mandrel wear, debris generation and fastener head malformation. The outer surface of the shank in contact with the wall of the workpiece apertures is far greater than that obtained by fasteners having helical threads or annular grooves on the fastener shank, and so stresses are lower when the joint is loaded subsequently.

Because the voids are positioned axially with respect to the fastener shank, they have a cross-sectional area which is constant along the length of the fastener shank. This ensures that the degree of radial expansion and the mandrel load are consistent, independent of grip thickness. The present invention can therefore be used in a greater grip range than that offered by equivalent-sized prior art fasteners. Furthermore the grip range which can be accommodated by a specific fastener is dependent only upon the length of the fastener, i.e. a longer fastener can accommodate a greater grip range.

Furthermore, the present invention provides that a single mandrel (i.e. a mandrel having a set head size) can be used to install a fastener into a workpieces having a variety of aperture sizes.

The present invention also provides greater expansion of the tail end of the fastener shank adjacent to the rear workpiece member, throughout the grip range, thereby providing increased resistance to separation of the workpiece members under tensile loads.

The present invention is also suitable for use in securing workpiece members which may be of harder material than the fastener.

The voids are preferably equidistant from one another.

The fastener head may include a counterbore in its top surface, the counterbore having an average diameter which is greater than the minor diameter of the bore of the fastener. The counterbore could be parallel to the longitudinal axis of the fastener bore, or could comprise a flat or a curved annular tapered wall, and a tapered transition portion could be provided between the counterbore and the fastener bore, wherein the spline minor diameter increases towards the counterbore. The counterbore and the tapered transition portion both accommodate axial spline material which is drawn axially through and into the fastener head by the passage of the enlarged mandrel head through the fastener bore. Furthermore, the counterbore controls the broach load on installation of the fastener, and avoids excess spline material pulling out from the top of the installed fastener head.

The tail end section of the fastener may include a tapered point. An advantage of the tapered point is that it allows fasteners to be nested together "head-to-tail" in a stack within a paper pod, etc, when a counterbore is provided in the fastener head. This ensures coaxial alignment of adjacent fastener bores which in turn makes it easier to load the fastener stack as one onto a mandrel shank. This stack may be packaged in a paper "pod" for ease of handling, the pod being easily stripped off the stack by hand once it has been loaded onto the mandrel. Furthermore the tapered point also assists in locating the fastener in the workpiece aperture, and reduces the height of the stack of fasteners prior to installation, thus permitting more fasteners to fit a placing tool of a given length, and provides increased rigidity to the stack on the relatively flexible mandrel.

The end section of the fastener may also include a solid tail ring, i.e. wherein the voided section does not extend into the tail ring. The tail ring, despite its remote position from the rear workpiece member, nonetheless contributes to the ultimate tensile strength of the fastener via its reinforced wall section.

In addition to the tapered point, the end section of the fastener may further comprise a "dog point", i.e. a straight annular wall which is parallel to a longitudinal axis of the fastener, wherein the dog point is located further away from the splined section than the tapered point. In an embodiment of the present invention wherein the counterbore is parallel to the longitudinal axis of the fastener bore, and the diameter of the dog point is similar to that of the counterbore, fasteners can be nested together "nose to tail" in the delivery format within the paper pod, etc, i.e. the dog point and counterbore facilitate the storing of multiple fasteners "head-to-tail" in a stack prior to installation, whereby the increased mechanical engagement of the dog point into the adjacent fastener head counterbore further enhances the coaxial alignment of adjacent fastener bores and greatly increases resistance to bending of the stack.

The axial voids of the present invention allow greater expansion of the fastener shank beyond the rear workpiece member, and also allow total aperture filling by the fastener shank in different sizes of workpiece aperture, (i.e. wherein the after installation of the fastener the aperture is completely filled with fastener shank material), without leading to "overpacking", thereby avoiding excessive broach loads and excessive stresses in the workpiece apertures.

Furthermore the present invention generates an enlarged tail end formation adjacent to the rear workpiece member throughout a grip range, and the grip range throughout which the fastener can be used is greater than that offered by equivalent-sized prior art fasteners.

In the present invention, the fastener shank has a central region featuring an increased wall thickness which incorporates a plurality of axial "voids". The axial voids extend radially outwards from the minor diameter of the shank bore.

Inside the head the fastener bore is of greater diameter than the shank bore minor diameter, and there is a tapered transition region between the two.

The radial expansion of the fastener shank beneath the fastener head is sufficient to create hole filling in joints where the aperture in the top workpiece member is larger than the aperture in the rear workpiece member and so there is mechanical resistance to shear movement.

The voids of the present invention are more substantial in size than those provided in prior art fasteners such as Avtronic and Rivscrew and are orientated axially, this providing a cross-sectional area that is constant along the length of the fastener shank where it expands into the rearmost workpiece member. This ensures that the degree of radial expansion and the mandrel load is consistent, independent of grip thickness.

The present invention provides a greater grip range and a greater tolerance to variation in aperture diameters than prior art fasteners. Furthermore, the fastener ensures hole-filling into oversized apertures in the top workpiece member, resulting in significant benefit in increasing joint stiffness in shear.

The enlarged tail formation adjacent the rearmost workpiece member is available throughout the grip range and offers greater mechanical resistance to joint separation under tensile loads.

BRIEF DESCRIPTION OF THE DRAWINGS

Embodiments of the invention will now be described by way of example only and with reference to the figures in which;

FIG. 2 is a side view of a fastener in accordance with the present invention prior to installation into a workpiece;

FIG. 3 is an isometric view of the fastener of FIG. 2;

FIG. 4 is a cross-sectional view of the fastener of FIG. 2 along the line IV-IV;

FIG. 5 is a cross-sectional view of the fastener of FIG. 2 along the line V-V;

FIG. 6 is a cross-sectional view of the fastener of FIG. 4 along the line VI-VI;

FIG. 9*a* is an axial cross-sectional view of the fastener of FIG. 2 installed into a workpiece wherein the aperture diameter of the top workpiece member is oversized;

FIG. 9*b* is an axial cross-sectional view of the fastener of FIG. 2 installed into a workpiece having a minimum grip;

FIG. 20 is a side view of a further alternative embodiment of fastener in accordance with the present invention;

FIG. 21 is a cross-sectional view of the fastener of FIG. 20 along the line XXI-XXI;

FIG. 22 is an isometric view of the fastener of FIG. 20;

DETAILED DESCRIPTION OF THE DRAWINGS

Figure 1:
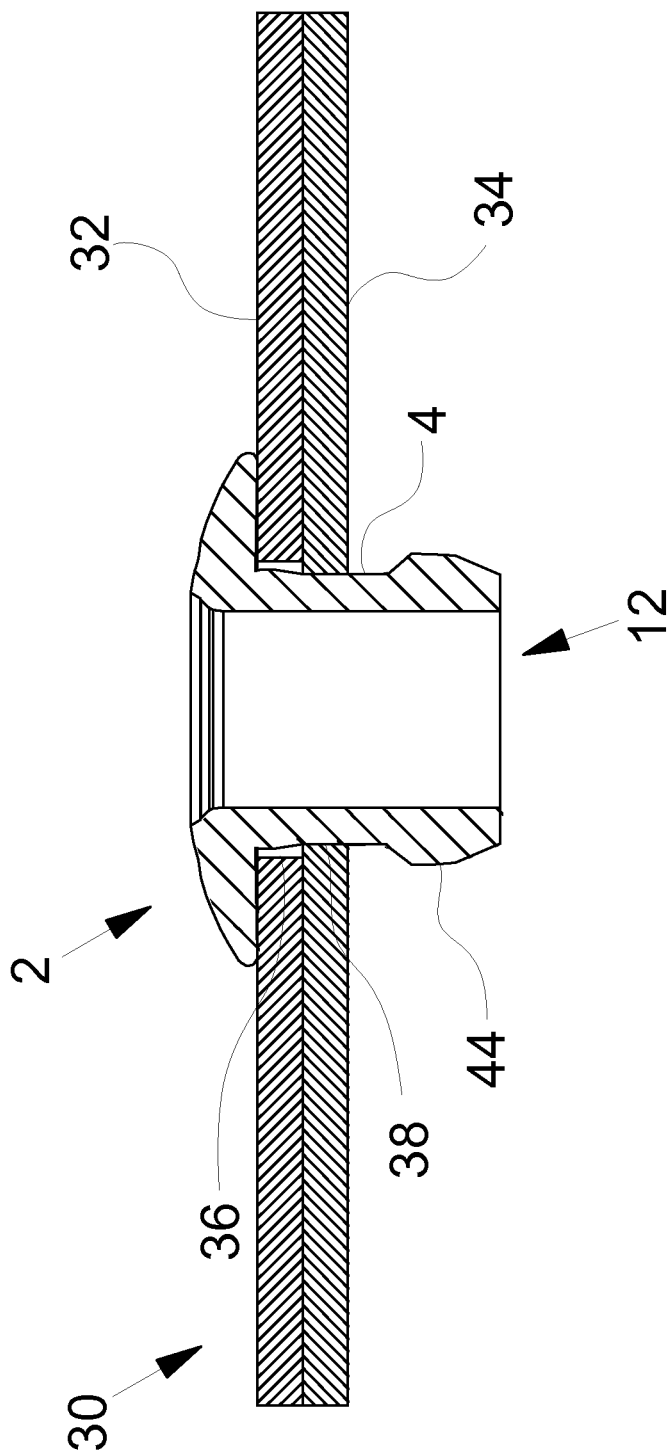
FIG. 1 is a side view of a prior art fastener installed into a workpiece.

Referring to FIGS. 2 to 6, a fastener 2 according to the present invention comprises a shaft 4, a radially enlarged head 6 at a head end 8 of the shaft 4, and an end section 60 comprising a tail ring 22 (shown in FIG. 5), a tapered point 10, and a dog point 62. The tail ring 22 and the dog point 62 are parallel to the longitudinal axis of the faster bore 14.

An annular underhead recess 42 is provided under the head 6. A bore 14 is provided throughout the fastener 2, i.e. throughout the head 6, shaft 4 and end section 60.

A splined section 16, comprising a plurality of axial splines 18, is provided on the internal wall 23 of the shank bore 14, between the head end 8 and the tail ring 22. The splines 18 extend radially inwardly from a major diameter D of the shank bore 14, to a minor diameter d of the shank bore 14, and extend axially between the head end 8 and the tail end 12 of the shaft 4. The splines 18 are spaced equidistantly from one another around the internal wall 23 of the bore 14. The splines 18 are of an approximate trapezoidal shape, and are separated by axial voids 40.

The tail ring 22, tapered point 10 and dog point 62 each comprise a solid wall, i.e. the voided section 16 does not extend into the tail ring 22, tapered point 10 or dog point 62.

Figure 7:
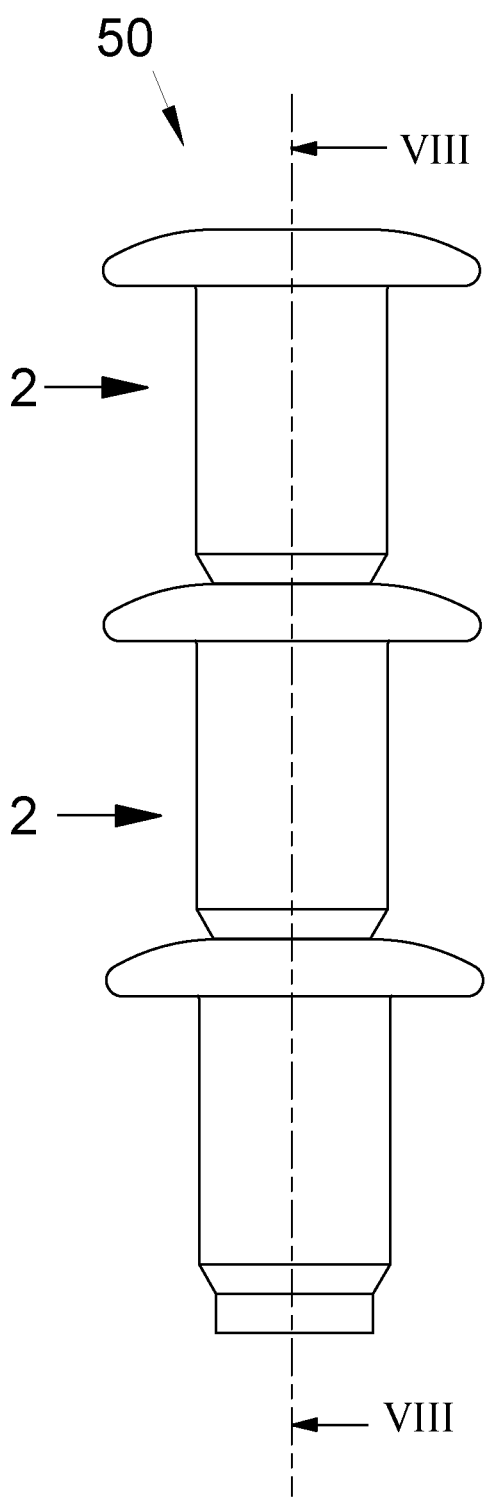
FIG. 7 is a side view of a plurality of fasteners of FIG. 2 arranged in a stack.
Figure 8:
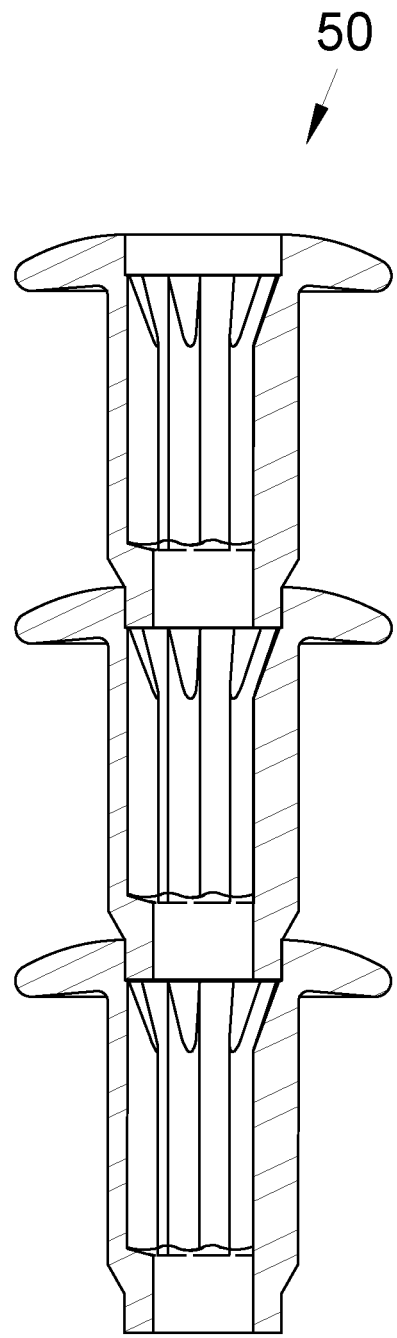
FIG. 8 is cross-sectional view of the stack of fasteners of FIG. 7 along the line VIII-VIII.
Figure 10B:
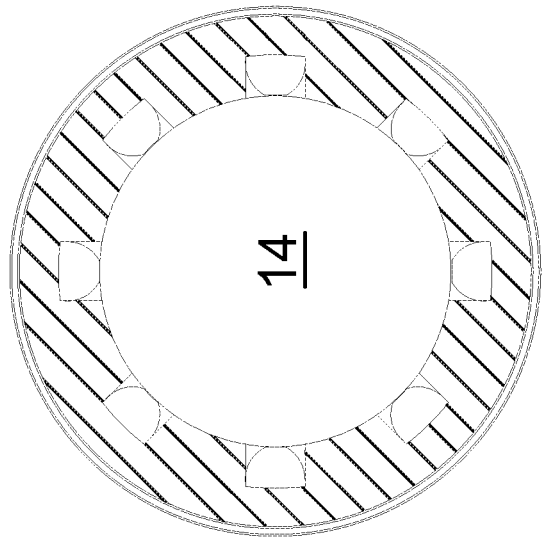
FIG. 10*b* is a cross-sectional view of the installed fastener of FIG. 9*b* along the line Xb-Xb.
Figure 10A:
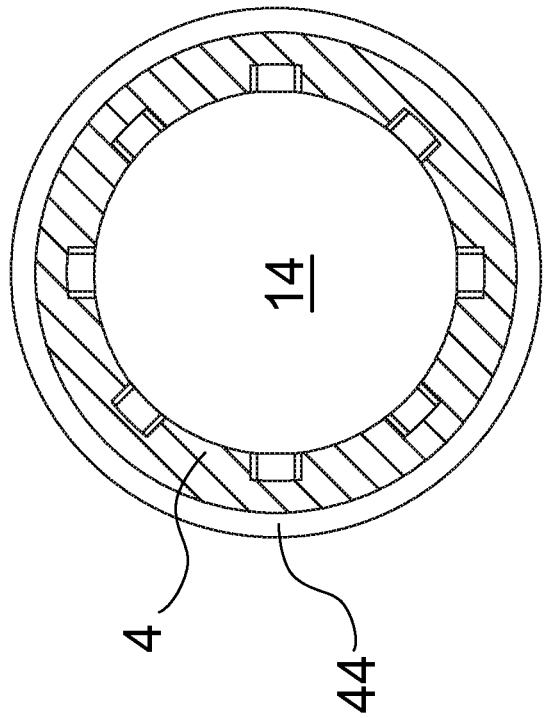
FIG. 10*a* is a cross-sectional view of the installed fastener of FIG. 9*a* along the line Xa-Xa.

A counterbore 26 is provided in the top surface 5 of the head 6. The counterbore 26 comprises a flat, annular wall, which is parallel to the longitudinal axis of the fastener bore 14. The diameter of the counterbore 26 is similar to the outer diameter E of the dog point 62, thereby allowing a plurality of fasteners 2 to be arranged "head-to-tail" in a stack 50, as illustrated in FIGS. 7 and 8.

A tapered transition section 17 is provided between the counterbore 26 and each of the splines 18.

Figure 25:
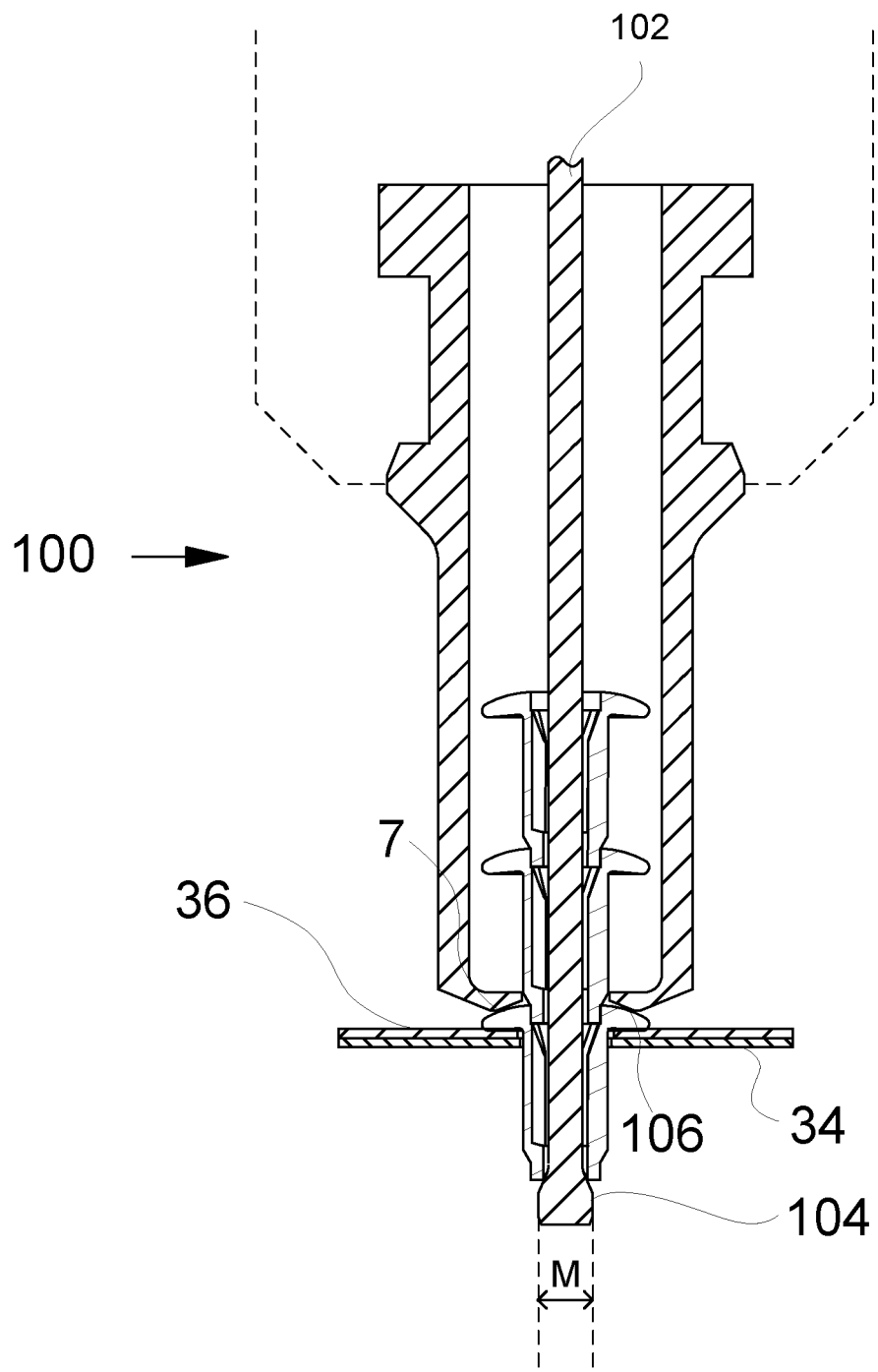
FIG. 25 is cross-sectional view of a fastener, workpiece, tool nose (remaining tool is omitted for clarity) and mandrel in accordance with the present invention.

Installation of the fastener 2 to secure a workpiece 30 comprising a first, top workpiece member 32 and a second, rear workpiece member 34 (i.e. the workpiece member which is furthest away from the fastener head) is effected by a tool having a nose 100, and mandrel 102 (FIG. 25). The mandrel 102 has a radially enlarged head 104 of maximum diameter M (where M is greater than the minor diameter d of the fastener bore 14), through the bore 14 of the fastener 2, such that the radially enlarged head 104 of the mandrel is at the tail end 12 of the fastener shank 4. The fastener 2 and mandrel 102 are inserted into apertures 36, 38 provided in the workpiece members 32, 34. A conical concave end face 106 of the tool nose 100 is used to bear on the domed upper surface 7 of the fastener head 6. The tool nose 100 is used to pull the head 104 of the mandrel 102 through the fastener bore 14. As the mandrel head 104 has a greater diameter M than the minor diameter d of the fastener bore, the mandrel causes a radial force on the shank 4 of the fastener 2, thereby causing radial expansion of the fastener shank 4, causing the exterior wall 20 of the fastener 2 to fully engage with the walls of the workpiece apertures 36, 38. Once the exterior wall 20 of the fastener shank 4 has contacted the walls of the workpiece apertures 36, 38, the radial force caused by pulling the mandrel head 104 through fastener bore 14 then causes the crests 24 of the splines 18 to be compressed, thereby causing the splines 18 to be deformed, and material of the splines 18 to be displaced into the voids 40. "Overpacking" of the fastener 2 in the workpiece apertures 36, 38 is therefore prevented, as the shank 4 of the fastener 2 expands only a sufficient amount to fill the workpiece aperture. Excessive radial stresses upon the walls of the workpiece apertures 36, 38 are avoided as material of the fastener splines 18 deforms in a circumferential direction into the voids 40.

The counterbore 26 accommodates any fastener body material which is drawn axially through and into the fastener head 6 by the passage of the enlarged mandrel head 104 through the fastener bore 14. Furthermore, the counterbore 26 controls the broach load on installation of the fastener 2, and avoids excess fastener material pulling out from the top of the installed fastener head 6.

FIG. 9*a* illustrates the fastener 2 fully installed into a workpiece 30 having a maximum grip, and FIG. 9*b* illustrated the fastener 2 fully installed into a workpiece 30 having a minimum grip.

The force applied by the conical concave end face 106 of the tool nose 100 to the domed upper surface 7 of the fastener head 6 causes the head 6 to be pushed towards the top workpiece member 32 and the head to flatten slightly against the top workpiece member 32, and thereby ensuring clamping of the fastening. The flattening of the head periphery 21 against the top workpiece member 32 acts such that the outer diameter of the underhead recess 42 decreases, and the bearing area of the fastener head 6 against the workpiece 30 is increased. Furthermore the bearing area of the tool end face 106 on the upper surface 7 of the fastener head 6 is greater than with prior art speed fasteners such that undesirable indentations or damage to the surface of the fastener head 6 are minimised during installation of the fastener.

Figure 12:
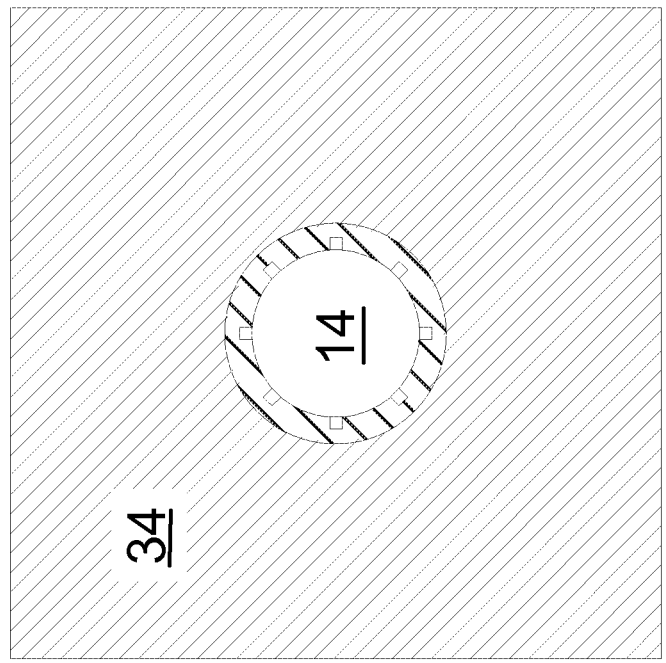
FIG. 12 is a cross-sectional view of the installed fastener of FIG. 9*a* along the line XII-XII.
Figure 11:
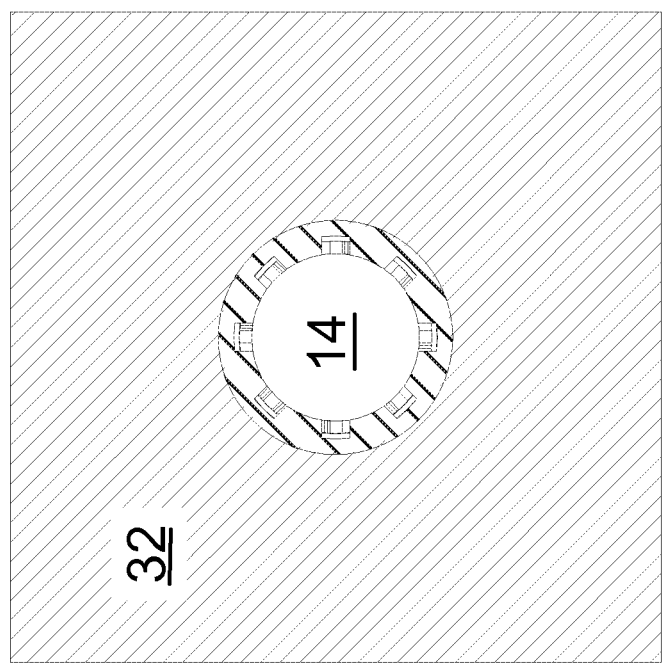
FIG. 11 is a cross-sectional view of the installed fastener of FIG. 9*a* along the line XI-XI.

The extent to which the crests 24 are crushed by the mandrel head 106 during installation is determined by the diameter of the workpiece aperture. An oversize workpiece aperture will result in the crests 24 being only slightly crushed. This is illustrated in FIG. 11, which illustrates marginal crushing of the crests 24, and marginal displacement of the crest material into the voids 40. As illustrated in FIG. 12, an aperture having a nominal diameter (i.e. which is smaller than the oversized aperture of FIG. 11), will result in a greater degree of crushing of the crests 24 than occurs with the oversized aperture of FIG. 11.

The displaced material of the crushed crests 24 is accommodated by the axial voids 40. For a minimum diameter workpiece aperture, the axial voids 40 will be completely filled by displaced crest material.

The tail ring 22 helps support the ends of the splines 18. At the tail ring 22, the cross-sectional area and resistance to further movement is higher as this portion is a solid ring, therefore ensuring high ultimate tensile strength of the installed fastener.

It is possible that fastener 2 and/or that the aperture 38 of the rear workpiece member 34 are not concentric with the aperture 36 of the top workpiece member 32. In this situation, the crests 24 of the splines 18 will each be crushed by differing amounts around the periphery of the mandrel head 104, thereby still ensuring full mechanical engagement of the shank 4 against the wall of both apertures 36, 38, despite the eccentricity of the fastener 2 and/or the rear workpiece member aperture 38 relative to and top workpiece member aperture 36, and also minimising bending forces on the mandrel as it is pulled through.

FIGS. 9a to 10b also illustrate an enlarged tail formation 44 which results from the installation of the fastener 2. Beyond the rear workpiece member 34, the shank 4 is free to expand fully (see FIGS. 10a and 10b), thus creating a 'footprint' or enlarged tail formation 44 which is adjacent to the rear workpiece member 34 and which is in contact with the rear workpiece member 34 (see FIG. 10a). Because the enlarged tail formation 44 is formed adjacent to and in contact with the rear workpiece member 34, it therefore provides a greatly increased mechanical resistance to initial axial movement due to tensile loading on the fastening than is provided by prior art fasteners. The enlarged tail formation 44 is formed adjacent to the rear workpiece member 34 across a given grip range, as can be seen in FIGS. 9a and 9b.

In the above embodiment, the axial voids are provided by a plurality of splines of trapezoidal cross-section. However, in an alternative embodiment, the axial voids may be of a different cross-section.

In the embodiment described above, the fastener is installed by pulling a radially enlarged mandrel head completely through the fastener bore 14. However, alternative methods of expanding the fastener shank 4 thereby to install the fastener 2 are illustrated in FIGS. 13 to 17. The method illustrated in FIGS. 13 and 14 uses a solid breakstem 70, which comprises a breakneck point 72, a radially enlarged head 74, and plugging portion 76 between the breakneck point 72 and the head 74, wherein the plugging portion 76 is of an equivalent diameter to the maximum diameter M of the mandrel head 104 as used in the first embodiment. The breakstem 70 and fastener 2 are inserted into the apertures 36, 38 in the workpiece members 32, 34. The breakstem 70 is subsequently pulled through the fastener 2 by use of a placing tool, causing the plugging portion 76 to radially expand the shank 4 of the fastener, until the radially enlarged head 74 of the breakstem 70 contacts with the tail end 12 of the fastener shank 4, which causes the load being applied to the stem 70 to increase sufficiently to cause the stem 70 to fail at the breakneck point 72 FIG. 14 illustrates the fastener 2 fully installed into the workpiece 30. The plugging portion 76 remains within the shank 4 of the fastener 2 and contributes additionally to the ultimate shear strength of the installed fastener. Supplementary "barbs", knurls or similar (not shown) could be provided on the plugging portion outer surface to provided enhanced resistance against recoil of the stem plugging portion 76 on failure of the breakneck point 72 and against removal of the plugging portion 76 from the fastener 2 after installation.

Figure 15:
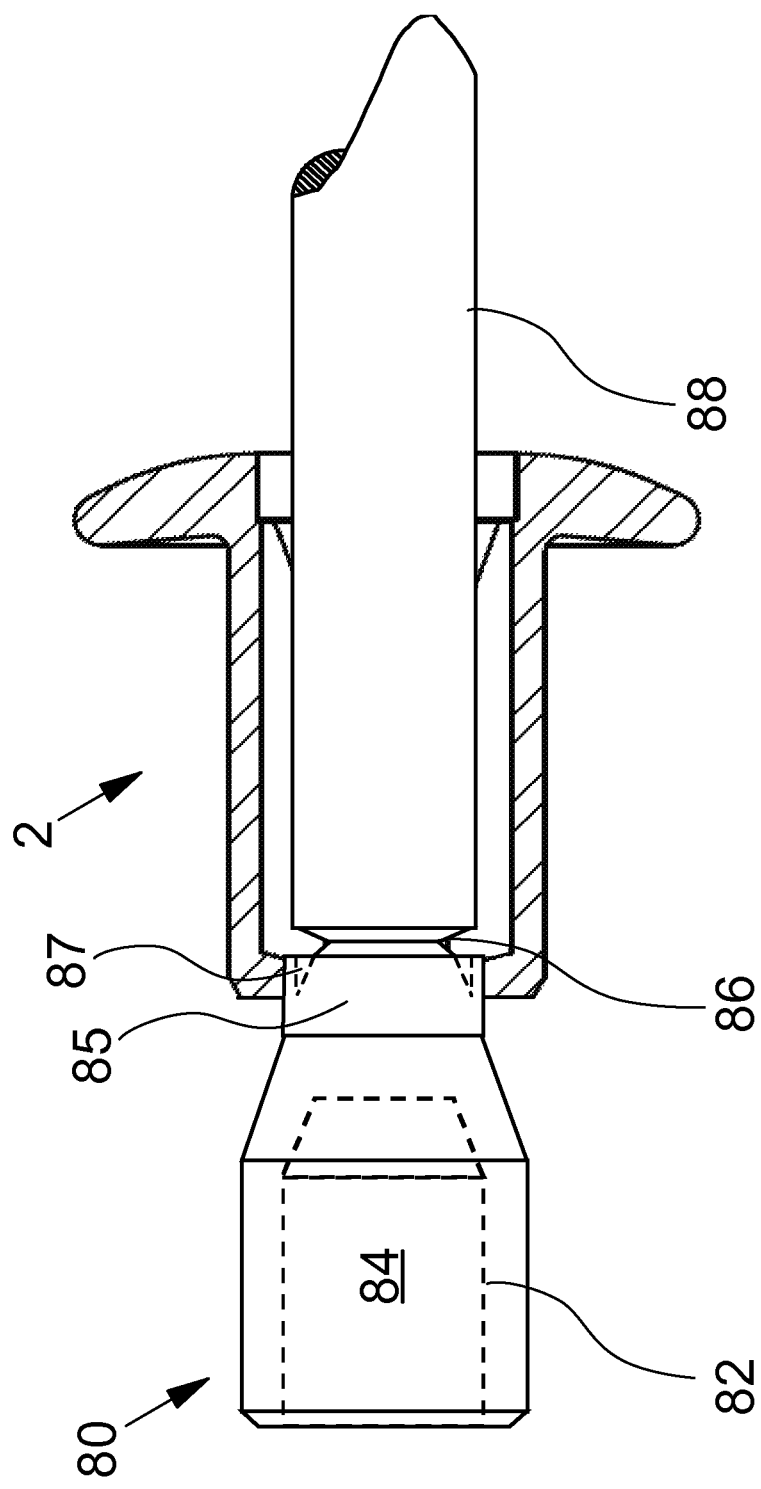
FIGS. 15 and 16 illustrate a further alternative method of installation of the fastener of FIG. 2.
Figure 16:
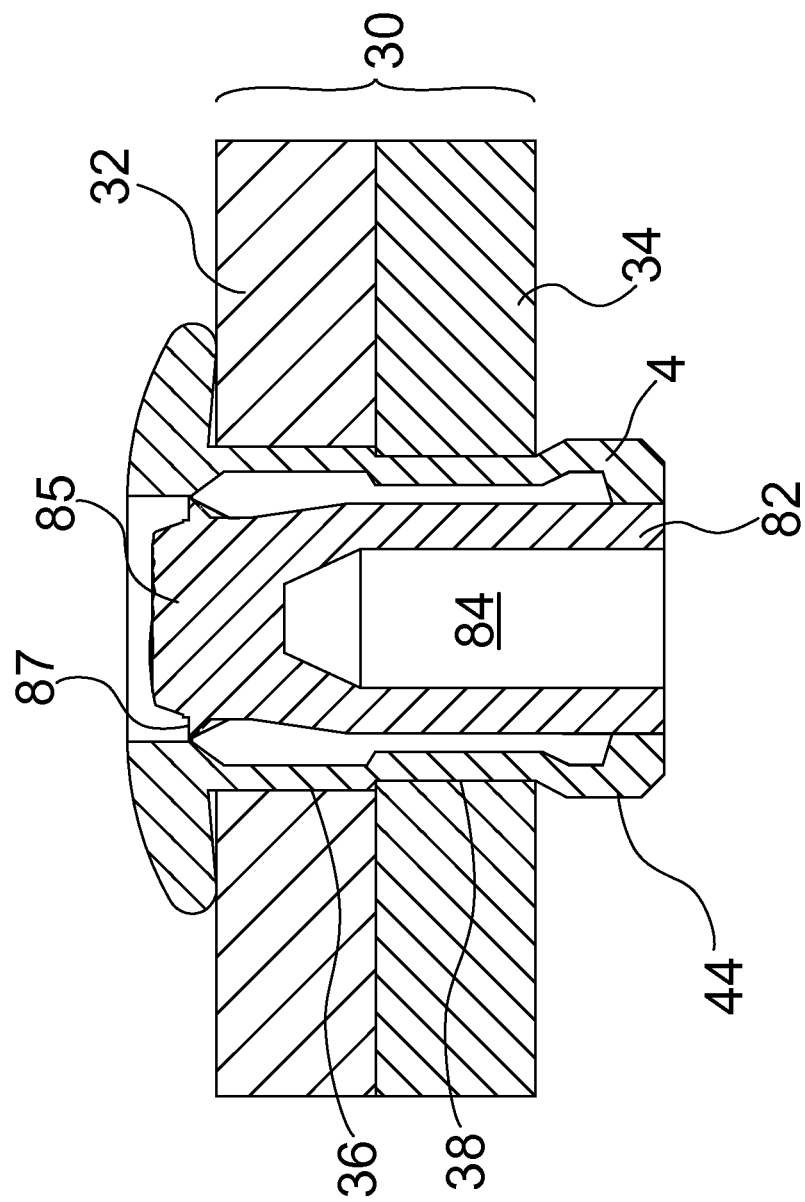

The alternative method illustrated in FIGS. 15 and 16 uses a breakstem 80 such as that available under the trade mark Monobolt (UK patent number GB1538872). The breakstem comprises a plugging portion 82 with a hollow core 84, a parallel portion 85 adjacent the plugging portion 82, an elongate shank 88, and a breakneck point 86 between the parallel portion 85 and the elongate shank 88. A locking skirt 87 in the form of a cylindrical lip may by provided at the end of the parallel portion 85 adjacent to the breakneck point 86. Installation of the fastener into a workpiece 30 involves inserting the fastener into the apertures 36, 38 in the workpiece members 32, 34, the breakstem is inserted into the bore 14 of the shank 4, such that the plugging portion of the breakstem contacts the tail end 12 of the fastener shank 4. The elongate shank 88 is then pulled relative to the fastener 2 thereby causing the breakstem plugging portion 82 to enter the fastener shank 4, simultaneously causing the fastener shank 4 to expand and the plugging portion 82 to collapse inwardly to a small degree due to the hollow core 84. The elongate shank 88 is pulled until the breakstem 80 fails at the breakneck point 86.

Figure 13:
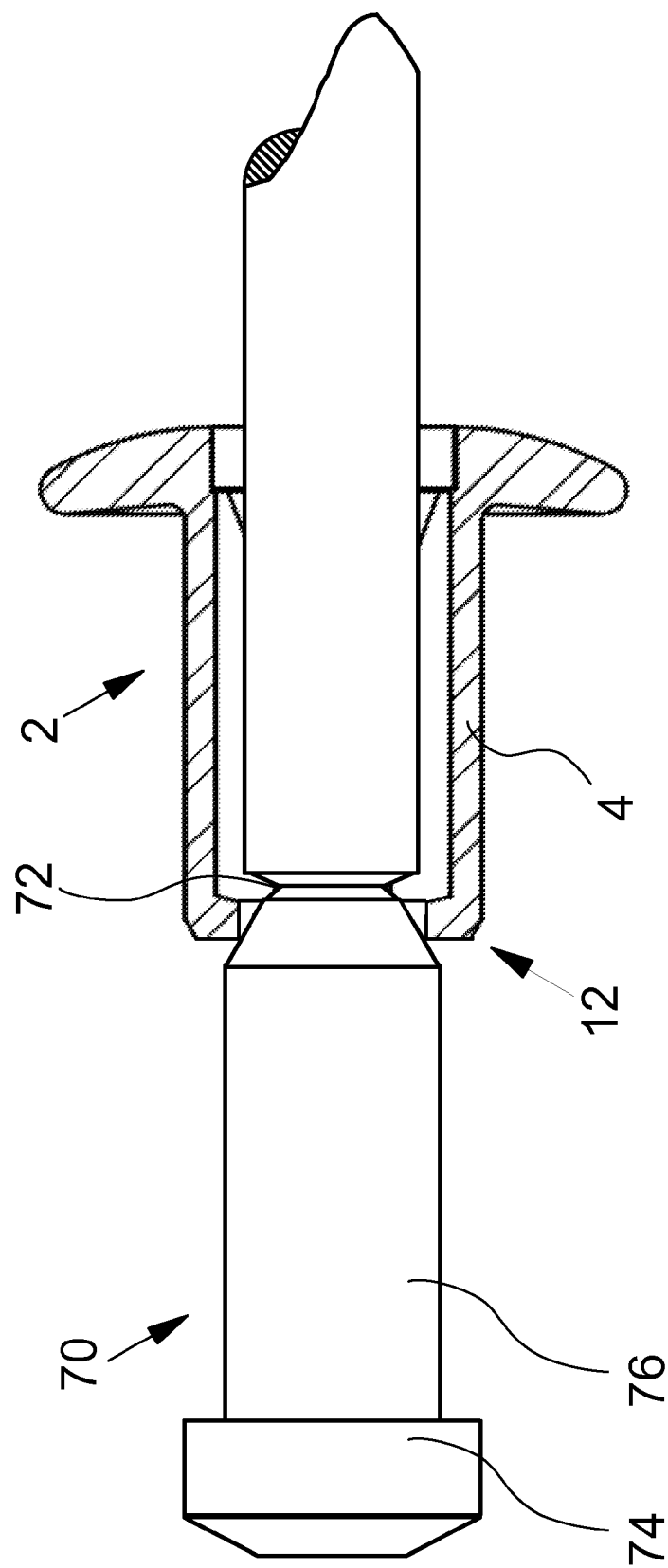
FIGS. 13 and 14 illustrate an alternative method of installation of the fastener of FIG. 2.
Figure 14:
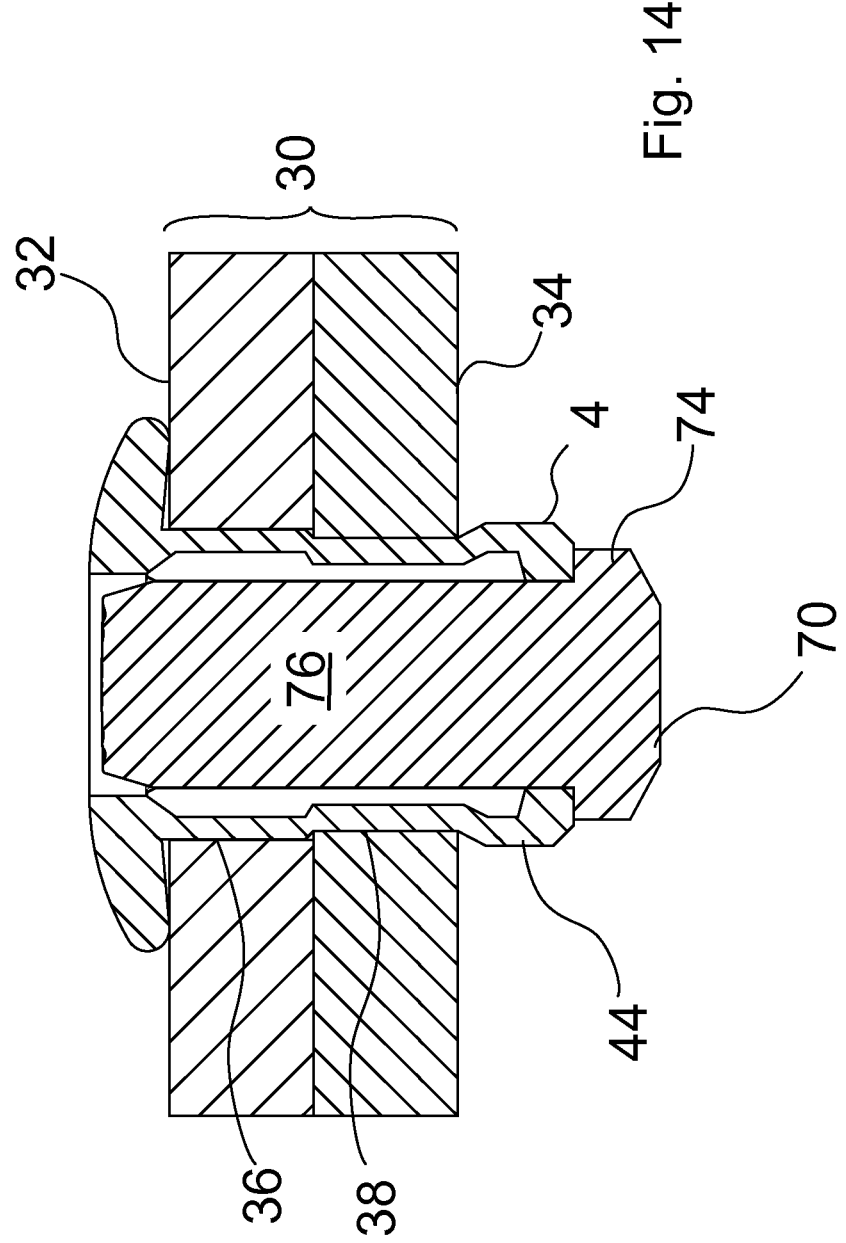

The slight inward collapse of the plugging portion 82 allows for a variation in workpiece aperture dimension, i.e. the plugging portion 82 is more compliant than the solid core of the breakstem 70 of FIGS. 13 and 14. This method of installation therefore provides an enhanced tolerance to differences in workpiece aperture diameter. The breakstem 80 could include a locking "skirt" feature 87 which is forced against the placing tool nose on installation of the fastener and material of the locking skirt 87 is displaced radially outwards into the counterbore in the fastener head as shown in FIG. 16. The locking skirt thereby provides a mechanical lock of the installed breakstem 80 in the fastener shank 4 to resist recoil of the plugging portion 82 on failure of the breakneck point 86 and against removal of the plugging portion 86 from the fastener shank 4 after installation.

Figure 17:
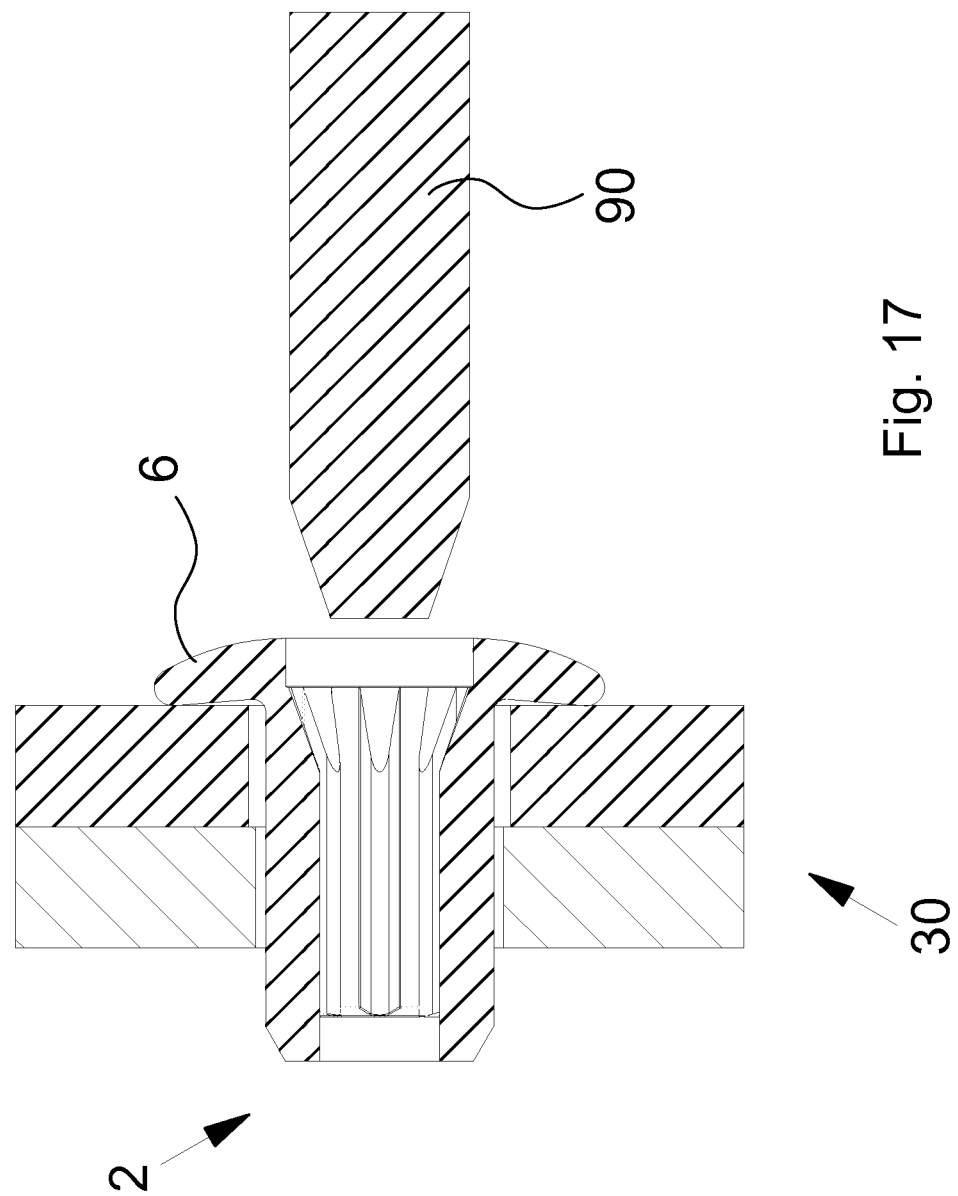
FIG. 17 illustrates a further alternative method of installation of the fastener of FIG. 2.

The method illustrated in FIG. 17 is a "push broach" method, wherein a solid pin 90, having a diameter larger than that of the fastener bore 14, is driven into the fastener 2 via the head 6 to expand the fastener shank 4. This pin 90 could remain in the fastener shank 4 permanently or could be a removable part of the placing tooling, in which case a support sleeve (not shown) might be needed around the pin 90 to bear on the fastener head 6 to allow removal of the pin 90 from the fastener shank 4.

Figure 19:
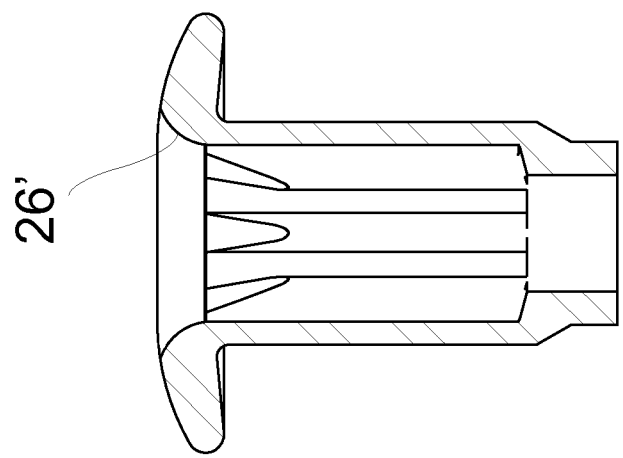
FIG. 19 is a cross-sectional view of the fastener of FIG. 18 along the line XIX-XIX.
Figure 18:
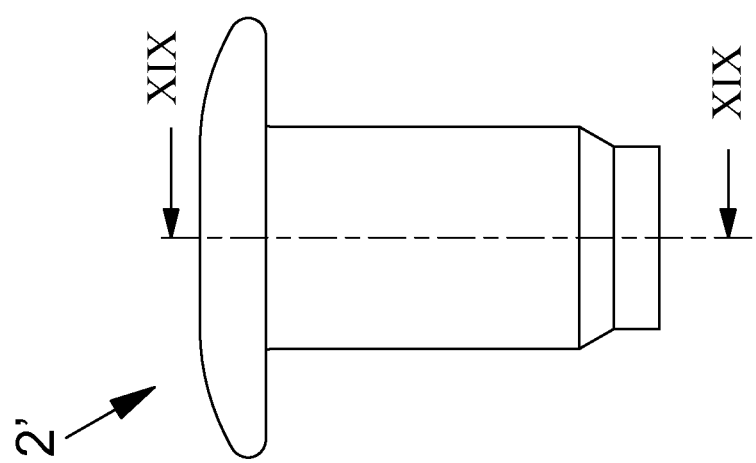
FIG. 18 illustrates a alternative embodiment of fastener in accordance with the present invention.

In the alternative fastener 2' as illustrated in FIGS. 18 and 19, the counterbore 26' comprises a curved annular wall. This embodiment radius reduces the likelihood of debris generation on installation of the fastener. The broach load caused when the mandrel head passes through the fastener head 6 is reduce, whilst maintaining sufficient tensile strength. During installation, some material of the fastener shank 4 is displaced backwards towards the tool; this material is accommodated by the counterbore 26' and avoids material being displaced above the top surface of the fastener head 5.

In the further alternative fastener 2", as illustrated in FIGS. 20 to 22, the end section 60 comprises only the tail ring 22" and tapered point 10. The counterbore 26" in the top surface 5 of the head 6 comprises a flat, annular tapered wall, such that the counterbore has a maximum diameter X furthest from the fastener bore, and a minimum diameter x closest to the fastener bore. The average diameter of the counterbore is therefore greater than the minor diameter d of the fastener bore. A tapered neck portion 28 is provided between the counterbore 26" and the fastener bore 14, wherein the maximum diameter Y of the neck portion 28 is equal to the minimum diameter x of the counterbore, and the minimum diameter y of the neck portion 28 is equal to the major diameter D of the fastener bore.

Figures 23, 24:
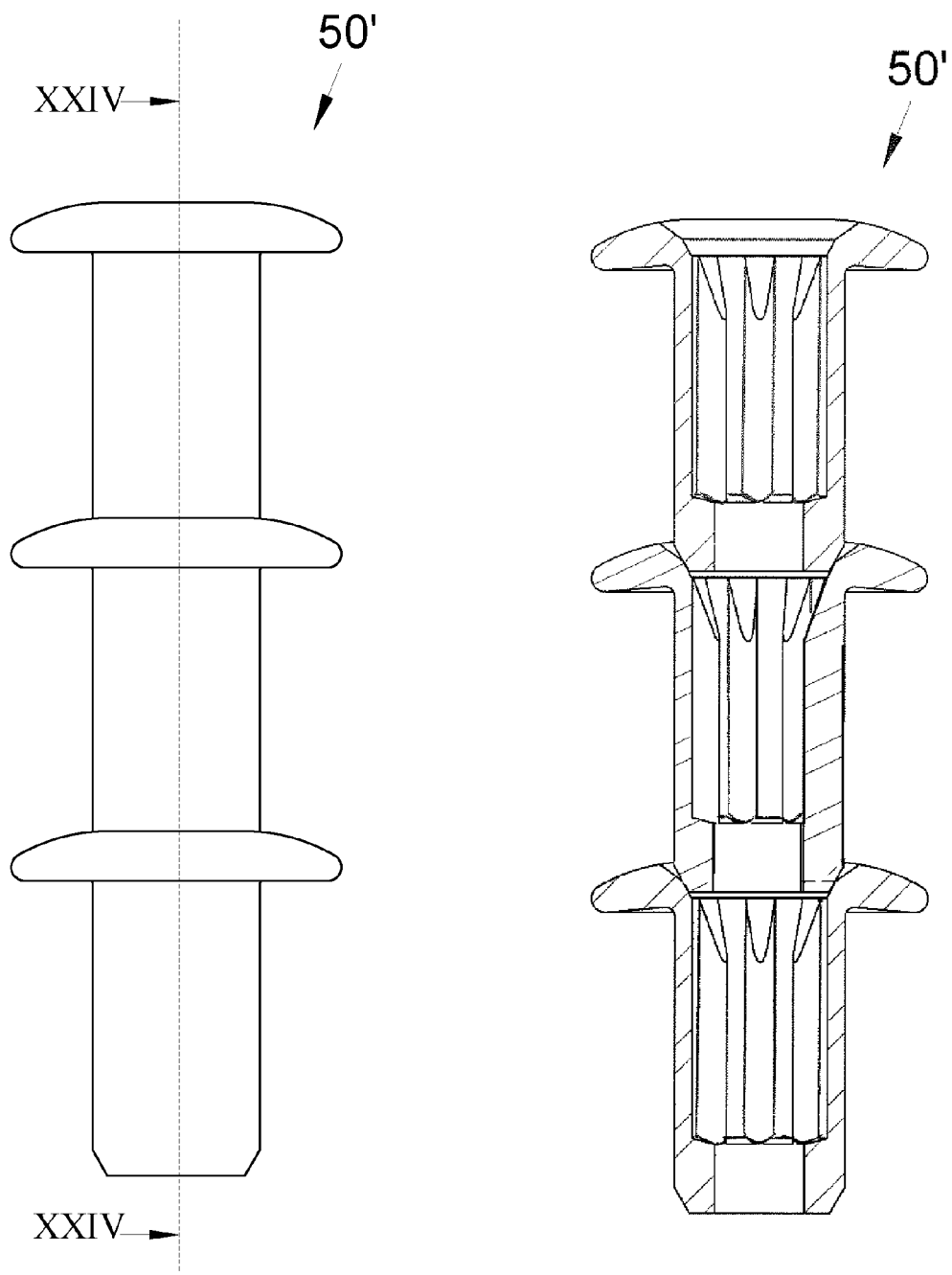
FIG. 23 is a side view of a plurality of fasteners of FIG. 20 arranged in a stack.
FIG. 24 is cross-sectional view of the stack of fasteners of FIG. 23 along the line XXIV-XXIV.

The fastener of FIGS. 20 to 22 can be provided in stack 50', as illustrated in FIGS. 23 and 24, ready for loading onto the mandrel or for sequential installation once on a mandrel within the placing tool. The maximum diameter X of the counterbore, and the angle of taper of the counterbore 26", are such that the tapered point 10 of an adjacent fastener 2' can be accommodated at least partially in the counterbore 26" and/or tapered neck 28, allowing the fasteners 2" to be stacked.

Further alternative fasteners (not shown in the figures) could comprise a combination of the counterbore and end section embodiments described above.

The invention claimed is:

1. A fastener, for securing a workpiece comprising a plurality of workpiece members, said fastener comprising a shank with a head end and a tail end remote from the head end, and a radially enlarged head at the head end of the shank, and a bore extending throughout the fastener;
    wherein an internal wall of the shank comprises a voided section comprising a plurality of voids separated by a plurality of splines each of which culminates in a crest, the voids and splines being elongated in an axial direction with respect to a longitudinal axis of the fastener bore;
    wherein the splines are of an approximate trapezoidal cross-section; and
    wherein the shank includes an unvoided solid tail ring between the voided section and the tail end of the fastener, the unvoided solid tail ring having an external diameter approximately equal to the external diameter of the shank in the voided section and an internal diameter approximately equal to a minor diameter of the voided section.

2. A fastener as claimed in claim 1 wherein the voids have a cross-sectional area which is constant along the length of the fastener shank.

3. A fastener as claimed in claim 2 wherein the axial voids are equidistant from one another.

4. A fastener as claimed in claim 1 wherein the axial voids are equidistant from one another.

5. A fastener as claimed in claim 1 wherein the fastener head comprises a counterbore provided in a top surface of the head remote from the fastener shank, the counterbore having an average diameter which is greater than the diameter of the bore of the fastener.

6. A fastener as claimed in claim 5 wherein the counterbore comprises a flat annular tapered wall.

7. A fastener as claimed in claim 6 wherein a tapered neck portion is provided between the counterbore and the fastener bore.

8. A fastener as claimed in claim 5 wherein the counterbore comprises a curved tapered annular wall.

9. A fastener as claimed in claim 8 wherein a tapered neck portion is provided between the counterbore and the fastener bore.

10. A fastener as claimed in claim 5 wherein the counterbore comprises a flat annular wall which is parallel to the longitudinal axis of the bore.

11. A fastener as claimed in claim 5, wherein the counterbore comprises a flat annular wall which is parallel to the longitudinal axis of the bore;
    and wherein the fastener further comprising a dog point at the tail end of the fastener, wherein the dog point comprises a straight wall the axis of which is parallel to the longitudinal axis of the bore;
    and wherein an outer diameter of the dog point is similar to the diameter of the counterbore.

12. A fastener as claimed in claim 1 further comprising a tapered point at the tail end of the fastener shank.

13. A fastener as claimed in claim 12 further comprising a dog point at the tail end of the fastener beyond the tapered point, the dog point comprising a straight annular wall which is parallel to a longitudinal axis of the fastener.

14. A fastener as claimed in claim 1, further comprising a solid tail ring at the tail end of the fastener shank, wherein the voided section does not extend into the tail ring.

15. A fastener as claimed in claim 1, further comprising a dog point at the tail end of the fastener, wherein the dog point comprises a straight wall the axis of which is parallel to the longitudinal axis of the bore.

16. A method of installing a fastener according to claim 1, thereby to secure a workpiece comprising a first apertured workpiece member and a second apertured workpiece member, the method comprising the steps of:
    a) placing a mandrel having a radially enlarged head through the fastener bore such that the radially enlarged head of the mandrel is adjacent the tail end of the fastener shank;
    b) inserting the fastener and mandrel into the apertures in the first and second workpiece members such that the fastener head contacts the first workpiece member;
    c) supporting the fastener at the head end whilst drawing the mandrel entirely through the fastener bore, thereby expanding the fastener shank into the apertures of the workpiece members, and causing the crests of the splines to be deformed, and causing the tail end of the fastener shank to radially enlarge adjacent to the second workpiece member.

17. A method as claimed in claim 16 wherein step c) is undertaken by a tool comprising a conical concave end face which bears on an upper surface of the fastener head.

18. A method of installing a fastener according to claim 1, thereby to secure a workpiece comprising a first apertured workpiece member and a second apertured workpiece member, the method comprising the steps of:
    a) inserting a stem comprising a radially enlarged head and a breakneck point into the fastener through the fastener bore such that the radially enlarged head of the stem is adjacent the tail end of the fastener shank;
    b) inserting the fastener and the stem into the apertures in the first and second workpiece members such that the fastener head contacts the first workpiece member;
    c) supporting the fastener at the head end whilst pulling the stem with respect to the fastener head, thereby causing the stem head to enter the tail end of the fastener shank thereby radially expanding the fastener shank into the apertures of the workpiece members, and causing the crests of the splines to be deformed against the stem head, and causing the tail end of the fastener shank to radially enlarge adjacent to the second workpiece member; wherein the stem is pulled with respect to the fastener head through the fastener bore until the stem fractures at the breakneck point.

19. A method of installing a fastener according claim 18, wherein the stem further comprises a parallel portion between the breakneck point and the plugging portion, and wherein, during step c), a locking skirt is displaced radially outwards from the parallel portion, thereby providing a mechanical lock of the installed stem in the fastener shank.

20. A method of installing a fastener according to claim 1, thereby to secure a workpiece comprising a first apertured workpiece member and a second apertured workpiece member, the method comprising the steps of:
   a) inserting the fastener into the apertures in the first and second workpiece members such that the fastener head contacts the first workpiece member;
   b) inserting a breakstem comprising a plugging portion with a hollow core, an elongate shank, and a breakneck point between the plugging portion and the elongate shank, into the bore of the fastener, such that the plugging portion of the breakstem contacts the tail end of the fastener shank;
   c) pulling the elongate shank of the breakstem pulled relative to the fastener, thereby causing the breakstem plugging portion to enter the fastener shank, causing the fastener shank to expand into the workpiece apertures, and causing the crests of the splines to be deformed against the plugging portion, and simultaneously causing the plugging portion to collapse inwardly; wherein the elongate shank is pulled relative to the fastener until the breakstem fails at the breakneck point.

21. A method of installing a fastener according claim 20, wherein the stem further comprises a parallel portion between the breakneck point and the plugging portion, and wherein, during step c), a locking skirt is displaced radially outwards from the parallel portion, thereby providing a mechanical lock of the installed stem in the fastener shank.

22. A method of installing a fastener according to claim 1, thereby to secure a workpiece comprising a first apertured workpiece member and a second apertured workpiece member, the method comprising the steps of:
   a) inserting the fastener into the apertures in the first and second workpiece members such that the fastener head contacts the first workpiece member;
   b) driving a solid pin, having a maximum diameter larger than that of the fastener bore, into the bore of the fastener via the head thereby to radially enlarge the fastener shank into mechanical engagement with the workpiece apertures, and causing the crests of the splines to be deformed against the solid pin.

23. A method of installing a fastener according to claim 22 further comprising a subsequent step of bearing on the fastener head by a support sleeve, and removing the pin from the fastener bore.

24. Fastening apparatus, for securing a workpiece comprising a plurality of workpiece members, said apparatus comprising a fastener and a mandrel;
   said fastener comprising a shank with a head end and a tail end remote from the head end, and a radially enlarged head at the head end of the shank, and a bore extending throughout the fastener;
   wherein an internal wall of the shank comprises a voided section comprising a plurality of voids separated by a plurality of splines each of which culminates in a crest, the voids and splines being elongated in an axial direction with respect to a longitudinal axis of the fastener bore; wherein the splines are of an approximate trapezoidal cross-section; and
   wherein the shank includes an unvoided solid tail ring between the voided section and the tail end of the fastener, the unvoided solid tail ring having an external diameter approximately equal to the external diameter of the shank in the voided section and an internal diameter approximately equal to a minor diameter of the voided section.

\* \* \* \* \*